J. F. MEIGS, F. G. HUGHES & R. P. STOUT.
FIRING MECHANISM FOR GUNS.
APPLICATION FILED APR. 29, 1903.

1,007,720.

Patented Nov. 7, 1911.
6 SHEETS—SHEET 1.

J. F. MEIGS, F. G. HUGHES & R. P. STOUT.
FIRING MECHANISM FOR GUNS.
APPLICATION FILED APR. 29, 1903.

1,007,720. Patented Nov. 7, 1911.
6 SHEETS—SHEET 6.

UNITED STATES PATENT OFFICE.

JOHN F. MEIGS, OF SOUTH BETHLEHEM, AND FREDERICK G. HUGHES AND ROBERT P. STOUT, OF BETHLEHEM, PENNSYLVANIA.

FIRING MECHANISM FOR GUNS.

1,007,720.     Specification of Letters Patent.     Patented Nov. 7, 1911.

Application filed April 29, 1903. Serial No. 154,833.

*To all whom it may concern:*

Be it known that we, JOHN F. MEIGS, residing at South Bethlehem, and FREDERICK G. HUGHES and ROBERT P. STOUT, residing at Bethlehem, county of Northampton, and State of Pennsylvania, citizens of the United States, have invented certain new and useful Improvements in Firing Mechanism for Guns, of which the following is a specification.

Our invention relates to the firing mechanism of guns and consists in the combination with the rotatable breech block of a movable support and firing pin supported thereby, and means whereby the parts are so shifted on turning the breech block that the point of the firing pin is brought to firing position only as the breech block is closed, as fully set forth hereinafter and as illustrated in the accompanying drawings, in which:—

Figure 1:
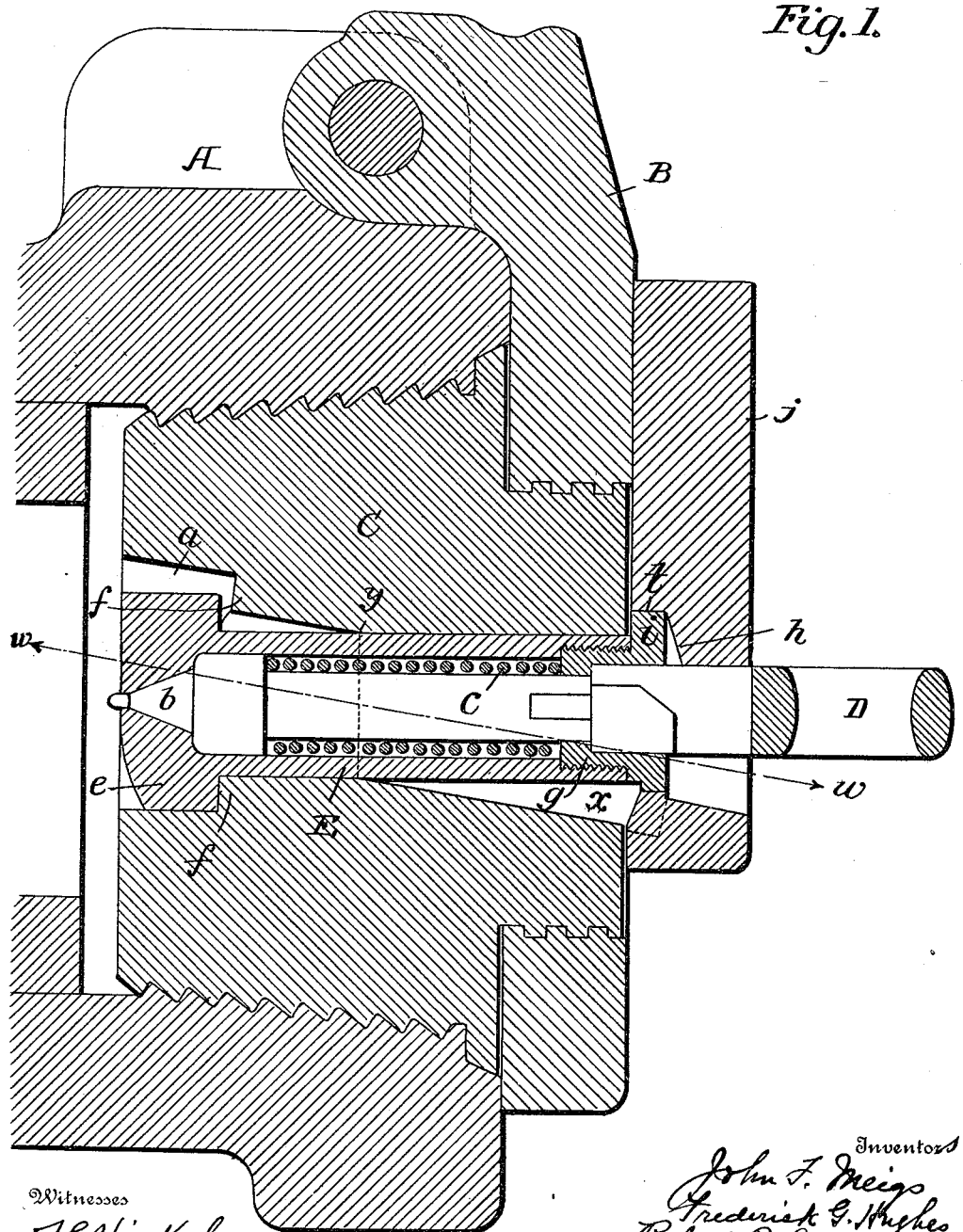
Figure 2:
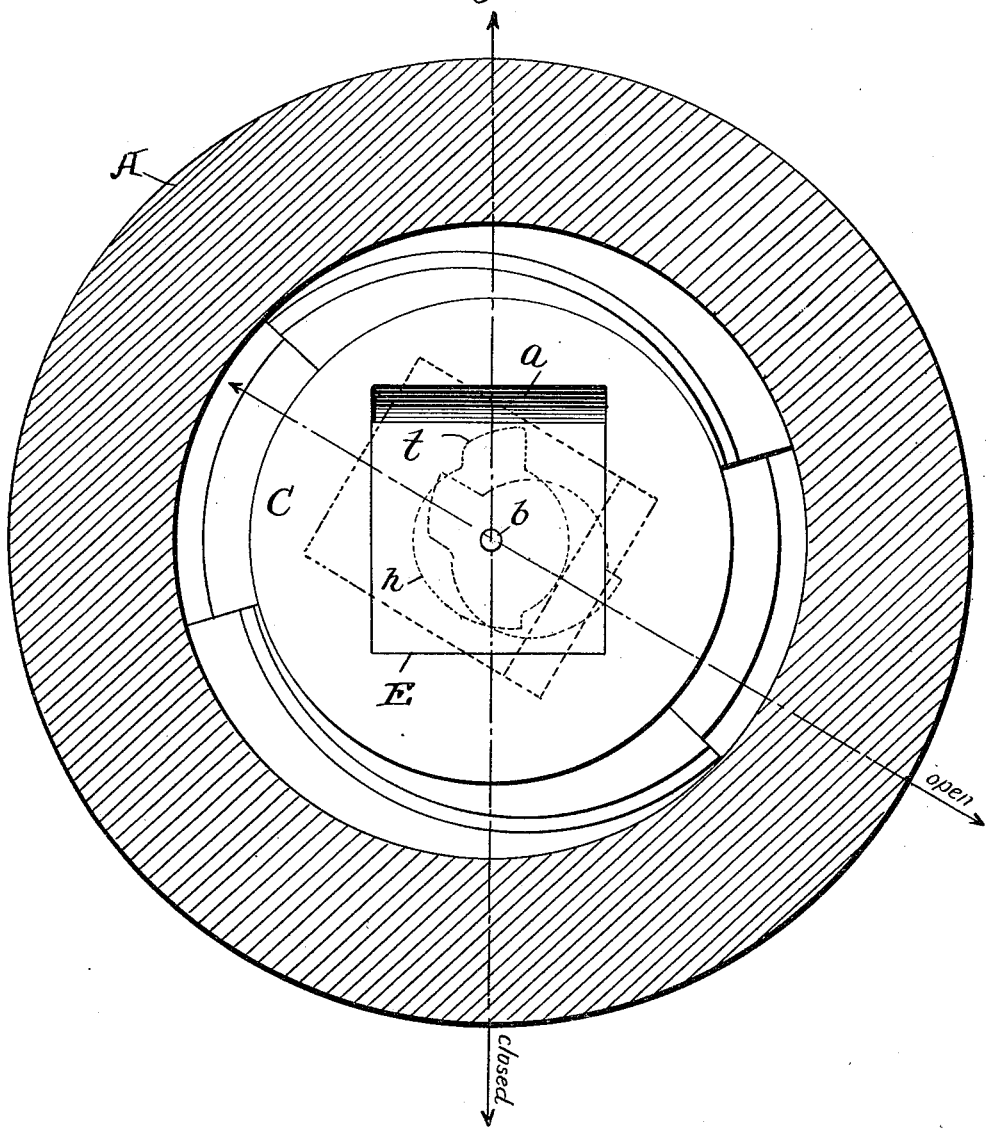
Figure 3:
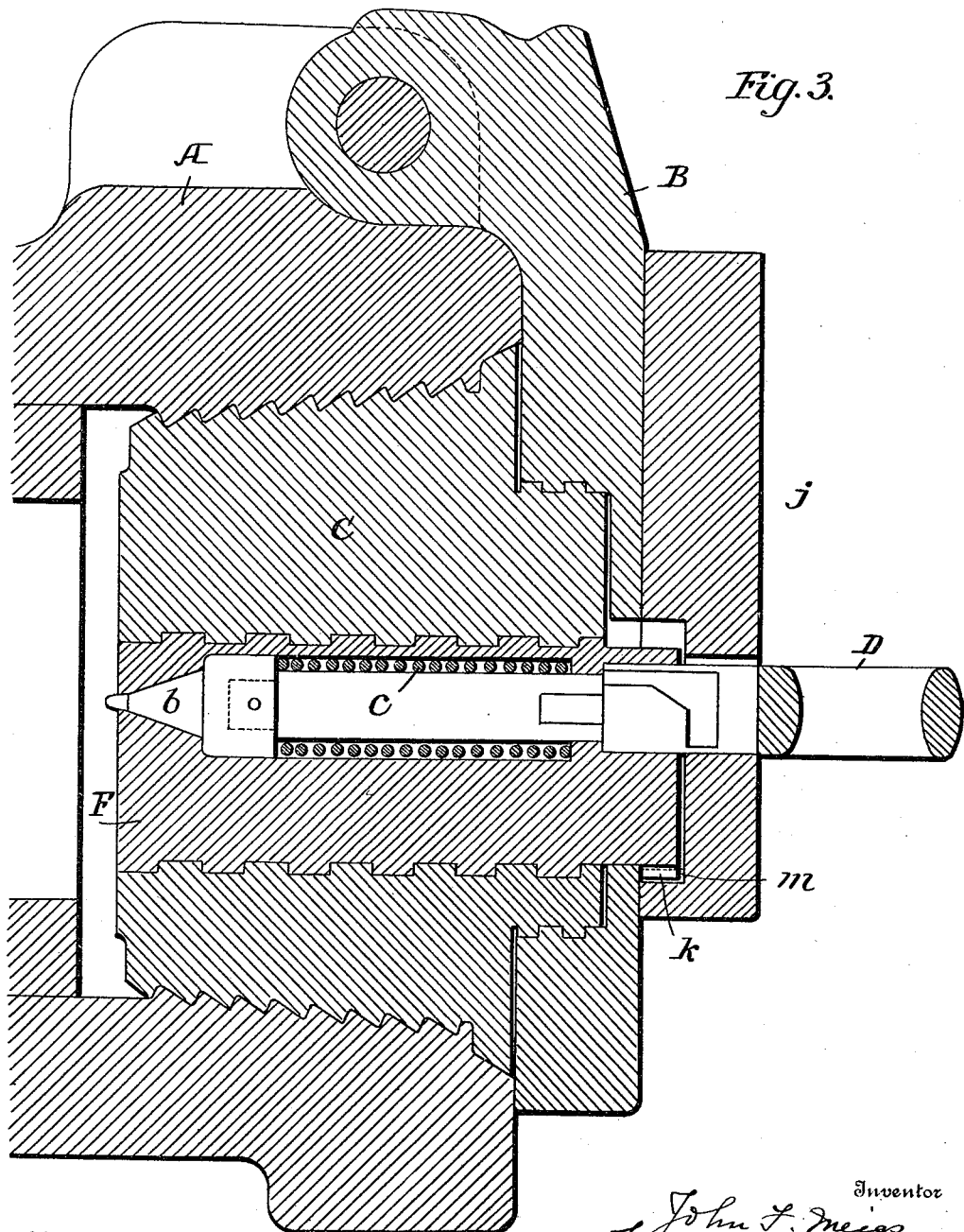
Figure 5:
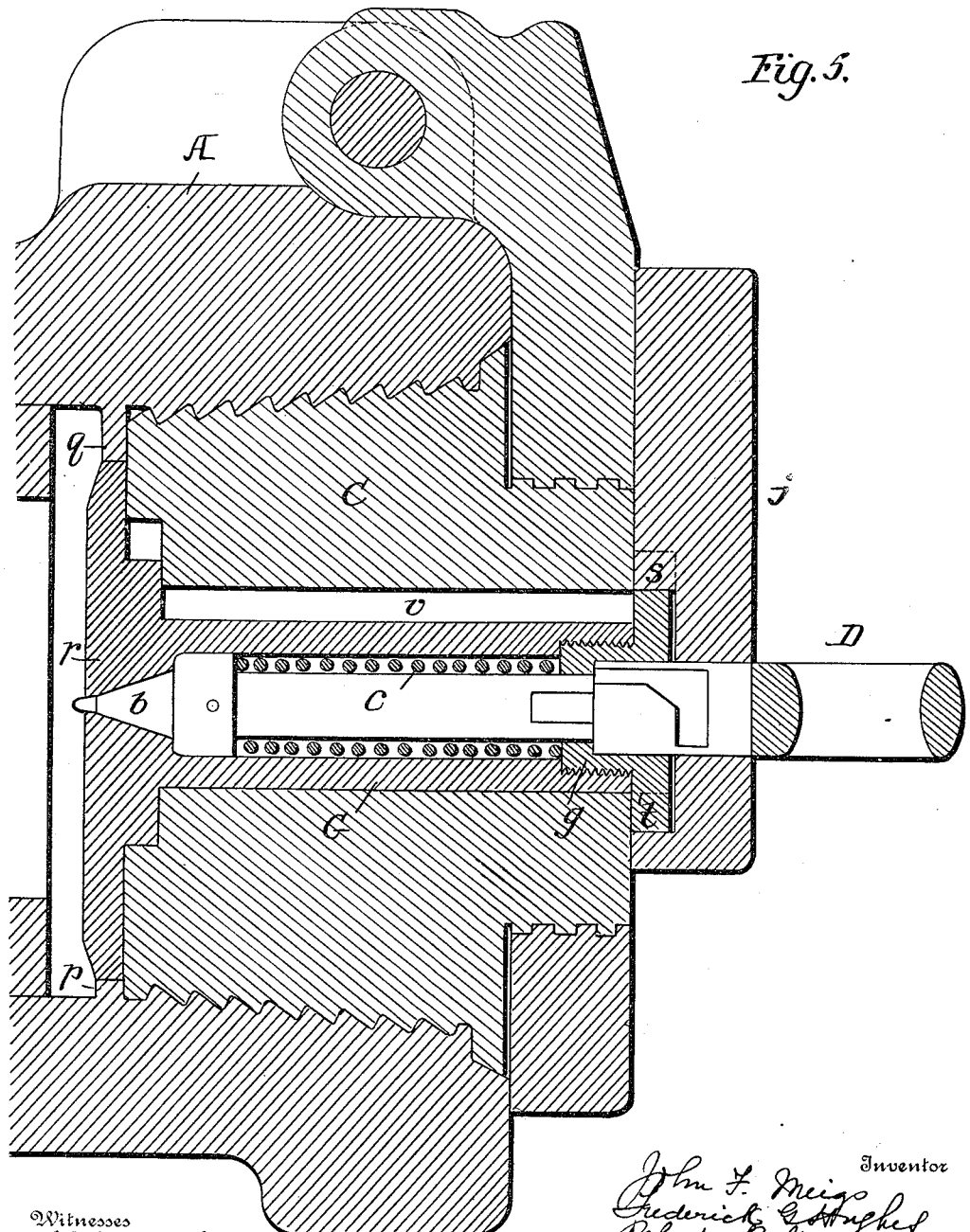
Figure 6:
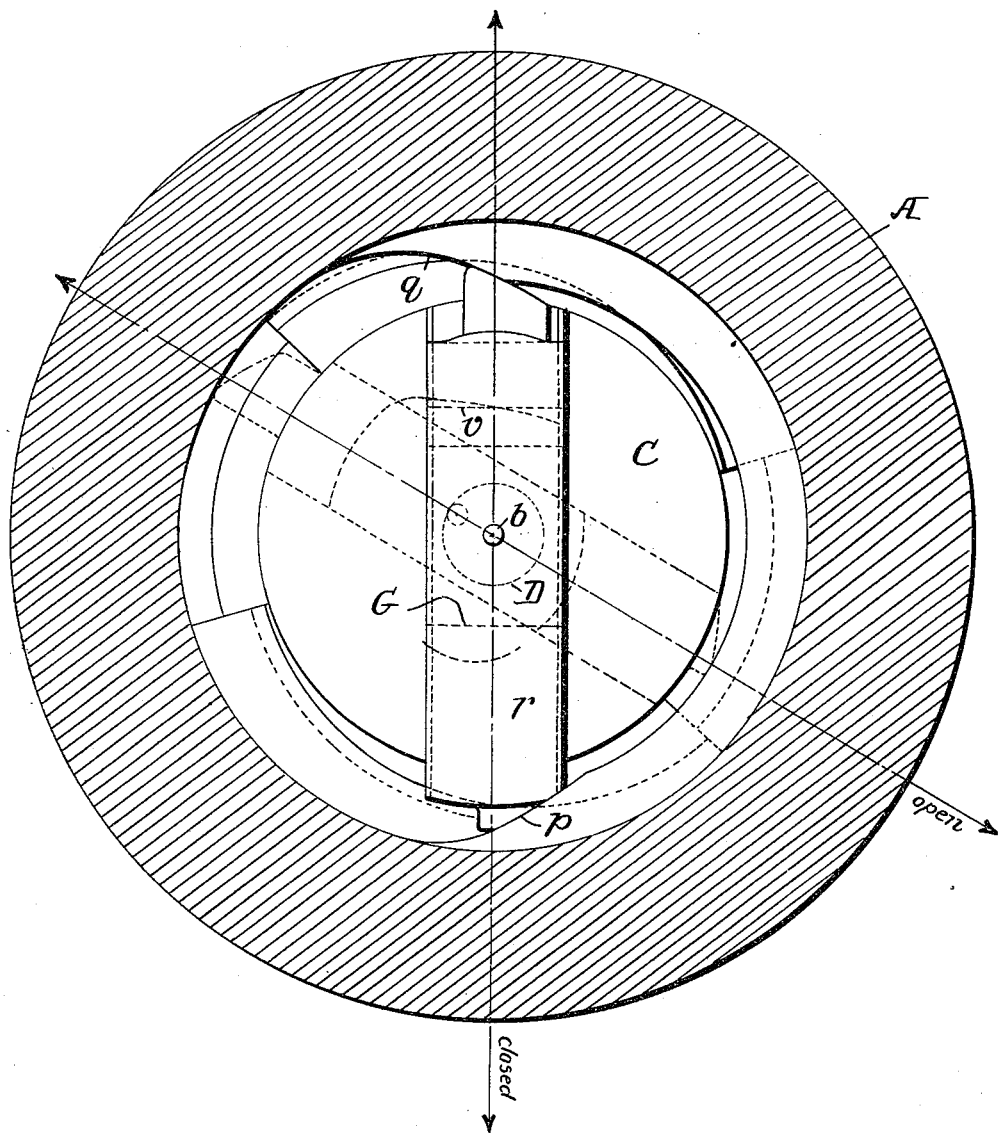

Figure 1 is a longitudinal section of the breech of a gun, illustrating our improvements; Fig. 2 is a transverse section looking toward the rear; Figs. 3 and 5 are longitudinal sections showing different means of supporting the firing pin movably in the breech block; and Figs. 4 and 6 are transverse sections, respectively, of Figs. 3 and 5, and looking toward the rear.

In the construction shown in Figs. 1 and 2, the breech A of the gun has mutilated screw threads adapted to those of the breech block C supported to rotate in the carrier B by means of any suitable appliances (not shown,) the breech block being axially concentric with the axis of the gun.

The pin D slides in a support E which extends into an opening or socket $x$ in the breech block, the said socket flaring toward each end from its most contracted portion $y$, which serves as a fulcrum upon which the support E may oscillate to thereby carry the pin D from a position axially concentric with the breech block to a position with its axis crossing that of the breech block as indicated by the lines $w$—$w$, so that the firing point $b$ in one position is eccentric to the axis of the breech block and gun, and in the other is concentric therewith and with the primer of the cartridge, and in a position to explode the latter. This explosion is effected by drawing back the firing pin D by usual means (not shown) and then releasing it so that it will be carried forward by the energy of a spring $c$ which is confined between a shoulder on the firing pin and a shoulder on the support so as to be compressed when the firing pin is carried back. To prevent the support from being thrust back by the force of the explosion, it is provided with a head $e$ which bears upon a shoulder $f$ of the breech block, and to permit the parts to be properly assembled, the rear end of the holder is recessed and threaded to receive a flange nut or follower $g$. In order to prevent any possibility of premature firing the support must be so controlled that the firing point $b$ shall coincide with the primer only as the breech block C completes its movement in closing the breech, and we therefore provide means whereby the support E is maintained axially out of line with the breech block and is brought into line with the pin $b$ opposite the primer only as the movement of the breech block C is completed. While different means may be employed for this purpose, we illustrate in Figs. 1 and 2 a construction which is effective, where the holder E is rectangular in cross section and fits a rectangular socket $x$, and is provided with a lug $i$ at the rear end, which engages a cam-like face $t$ of an opening $h$ in a plate $j$ fastened to or forming part of the carrier. The shape of the opening $h$ is such that as the breech block is turned the edge $t$ of the opening bearing upon the edge of the lug $i$ will shift the support E gradually from one position to the other, but will only bring it to a position with the firing point $b$ concentric with the primer when the breech block C is in its fully closed position.

Figure 4:
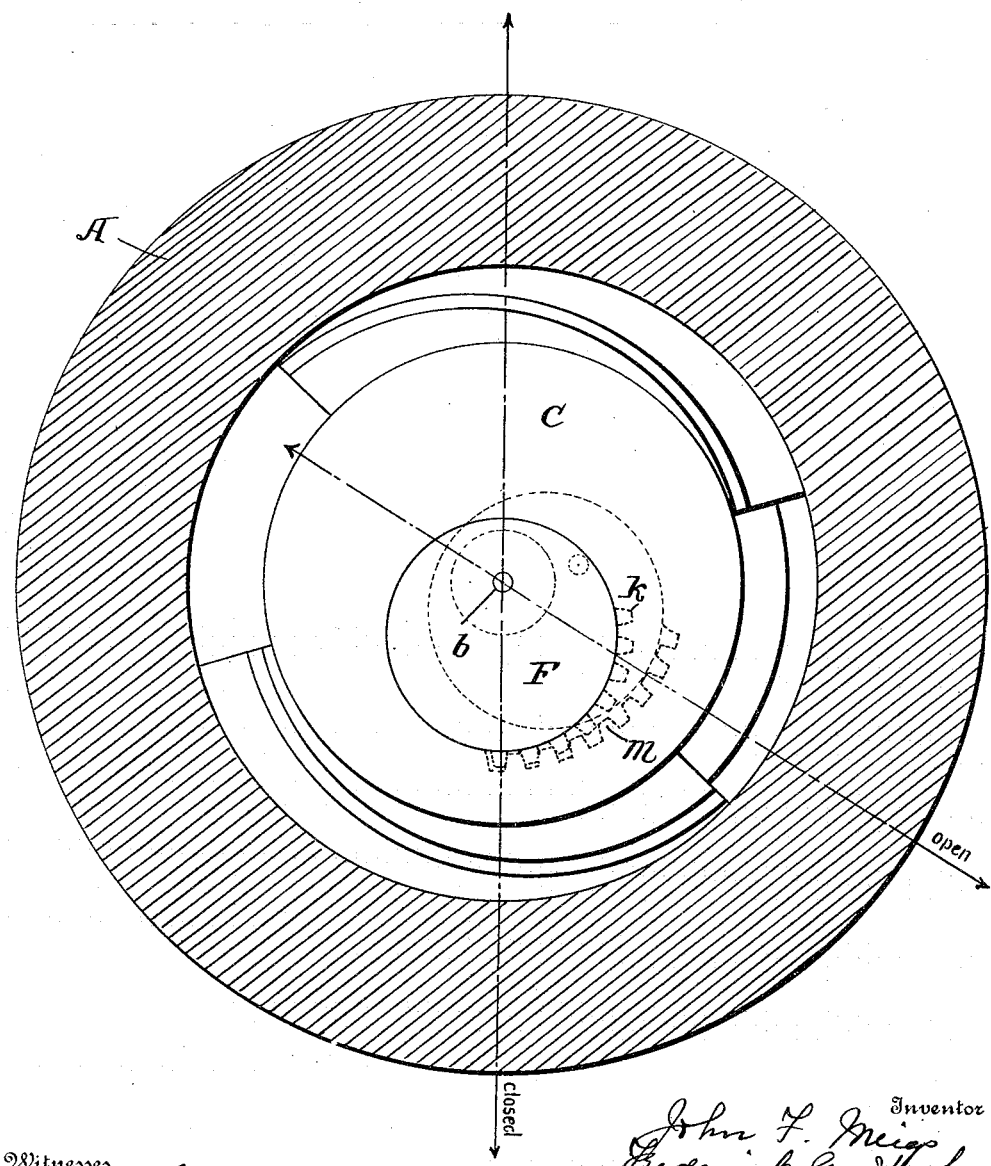

In the construction shown in Figs. 3 and 4 the firing pin D fits a longitudinal socket in a cylindrical support or holder F turning in a longitudinal opening in the breech block C. This opening, however, is eccentric to the axis of the block so that as the holder is turned the axis of the firing pin D is carried to and from the axis of the block C and this is automatically effected by forming on the rear end of the support F a rack $k$ which engages a rack $m$ upon the plate $j$, the parts being so positioned that the support F will be turned to carry the pin D to a position with its axis concentric with the breech block only as the latter is closed.

In the construction shown in Figs. 5 and 6, the pin D is carried by a support G which is always parallel to the axis of the breech block but slides laterally in a recess or socket *v* to carry the firing pin to and from the axis of the breech block. In this case, the sliding movement of the support G is effected by means of cams *p q* within the breech of the gun, and cams *s t* of the plate *j* which cams act upon the ends of a cross-piece *r* at the forward end and forming part of the support and on the rear end of the support in such manner that as the breech block is turned, the support is brought to a position with the axis of the firing pin coinciding with that of the breech block only as the closing of the latter is completed.

It will be seen that in all of the above constructions the firing pin has a support movable in the block but that it is maintained out of firing position by the automatic shifting of said support except at the instant when the breech block is closed.

Without limiting ourselves to the precise construction shown, we claim as our invention:

1. In a breech loading gun, the combination with the breech block, of a firing pin having a support movable in said breech block, the firing pin being concentric with the bore of the gun when the breech block is in firing position, and means for moving said support to shift the firing pin to an eccentric position with respect to the bore of the gun when the breech block is turned from firing position.

2. In a breech loading gun having a concentrically arranged rotatable breech-block, a firing pin working in said block and movable therein laterally from concentric to eccentric position with relation to the bore of the gun.

3. In a breech loading gun having a concentrically arranged rotatable breech-block, a firing pin having its point movable laterally to and from firing position, and means for automatically effecting the said movement of the firing pin point.

4. In a breech loading gun having a concentrically arranged rotatable breech block, a firing pin having its point movable laterally to and from firing position and means actuated by the rotation of the block for automatically effecting the said movement of the firing pin point.

5. In a breech-loading gun, the combination with its breech-block, of a detonating element, and means movable in said block for automatically shifting said element laterally therein.

In testimony whereof we have signed our names to this specification in the presence of three subscribing witnesses.

JOHN F. MEIGS.
FREDERICK G. HUGHES.
R. P. STOUT.

Witnesses:
J. E. MATHEWS,
EDWIN A. MILLER,
EARL G. RUSH.

---

Copies of this patent may be obtained for five cents each, by addressing the "Commissioner of Patents, Washington, D. C."